(12) United States Patent
Gäbler et al.

(10) Patent No.: US 9,452,371 B2
(45) Date of Patent: Sep. 27, 2016

(54) METHOD AND SYSTEM FOR PHASE INVERSION USING A STATIC MIXER/COALESCER

(75) Inventors: Ansor Gäbler, Constance (DE); Sven Glüer, Winterthur (CH)

(73) Assignee: Sulzer Chemtec AG, Winterthur (CH)

( * ) Notice: Subject to any disclaimer, the term of this patent is extended or adjusted under 35 U.S.C. 154(b) by 375 days.

(21) Appl. No.: 12/737,430

(22) PCT Filed: May 12, 2009

(86) PCT No.: PCT/EP2009/055741
§ 371 (c)(1),
(2), (4) Date: Mar. 2, 2011

(87) PCT Pub. No.: WO2010/012516
PCT Pub. Date: Feb. 4, 2010

(65) Prior Publication Data
US 2011/0152386 A1 Jun. 23, 2011

(51) Int. Cl.
*B01F 5/06* (2006.01)
*B01D 17/04* (2006.01)

(52) U.S. Cl.
CPC .......... *B01D 17/045* (2013.01); *B01F 5/0617* (2013.01); *B01F 5/0619* (2013.01)

(58) Field of Classification Search
CPC ... B01F 5/0682; B01F 5/0617; B01F 5/0619
USPC .............................. 366/165.1–165.2, 336–337
See application file for complete search history.

(56) References Cited

U.S. PATENT DOCUMENTS

| 5,507,958 | A | 4/1996 | White-Stevens |
| 5,772,901 | A | 6/1998 | Yu |
| 6,485,651 | B1 | 11/2002 | Branning |
| 6,649,069 | B2 * | 11/2003 | DeAngelis ......... B01D 19/0078 366/DIG. 4 |
| 2003/0005823 | A1 | 1/2003 | LeBlanc |
| 2008/0056064 | A1 | 3/2008 | Tanaka |
| 2009/0028763 | A1* | 1/2009 | Lavric .................. B01F 5/0268 422/600 |

FOREIGN PATENT DOCUMENTS

| JP | 58 128106 A | 7/1983 |
| JP | 2003-260343 | 9/2003 |
| JP | 2007 514529 A | 6/2007 |
| KR | 2002-0000536 A | 1/2002 |
| WO | 9740903 A1 | 11/1997 |
| WO | 02079099 A1 | 10/2002 |
| WO | WO2005005776 * | 1/2005 |
| WO | 2006016513 A1 | 2/2006 |

* cited by examiner

*Primary Examiner* — Tony G Soohoo
*Assistant Examiner* — Anshu Bhatia
(74) *Attorney, Agent, or Firm* — Francis C. Hand; Carella, Byrne, et al.

(57) ABSTRACT

A method and a system for phase inversion of a dispersion are disclosed, the dispersion comprising a first fluid, said first fluid forming a disperse phase and a second fluid, said second fluid forming a continuous phase. The dispersion is supplied in a fluid supply device to a phase inversion means. Thereby the first fluid is transformed from the disperse phase into the continuous phase and the second fluid is transformed from the continuous phase into the disperse phase. The phase inversion means comprises an element providing a fluid contacting surface for coalescence in a direction of flow.

4 Claims, 12 Drawing Sheets

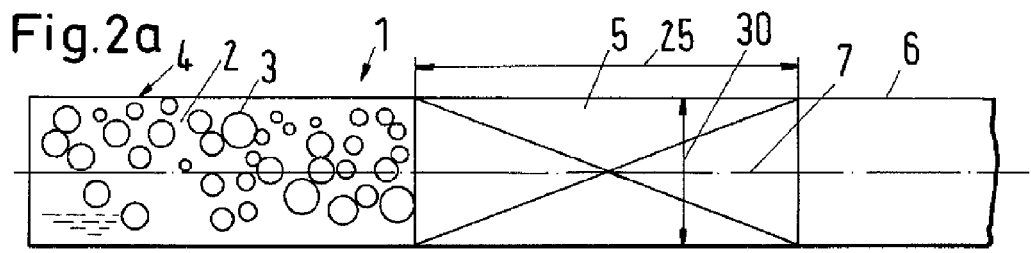
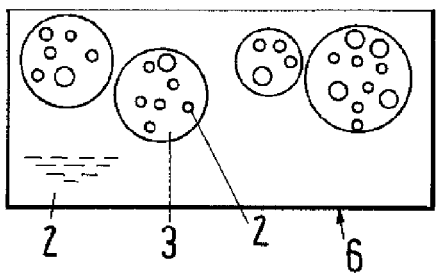
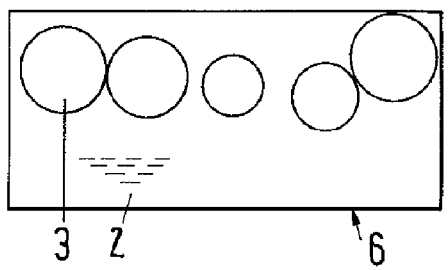
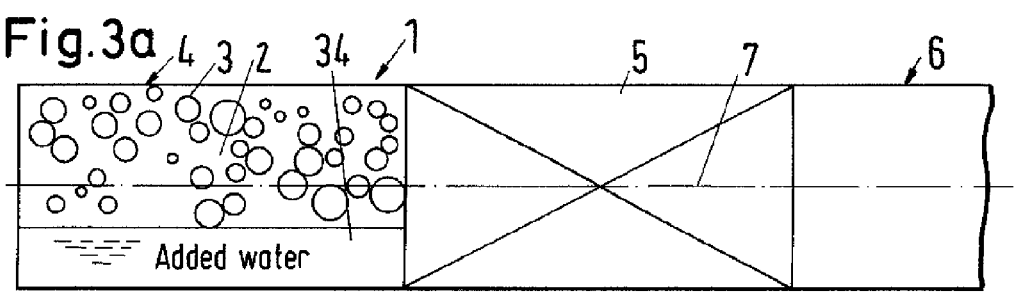
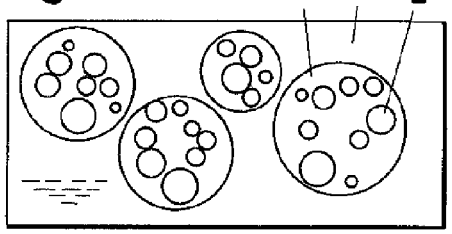
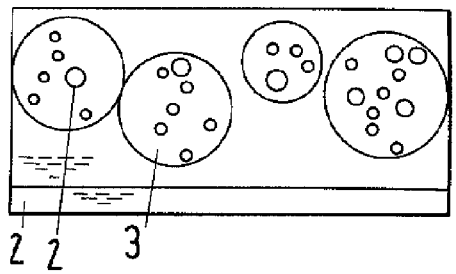
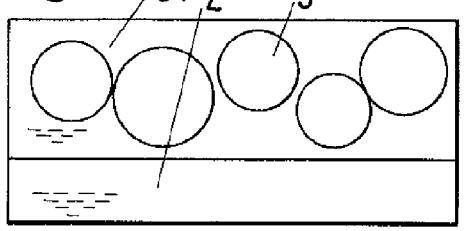
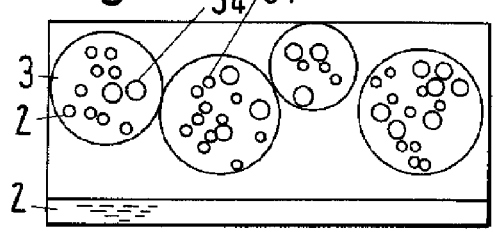

(A-A)

(B-B)

METHOD AND SYSTEM FOR PHASE INVERSION USING A STATIC MIXER/COALESCER

METHOD AND SYSTEM FOR PHASE INVERSION

The invention relates to a method for phase inversion in particular for dispersions and a system for performing said method. Under dispersion, a mixture of immiscible fluids is intended, comprising a first fluid, said first fluid forming a disperse phase and a second fluid, said second fluid forming a continuous phase. Under phase inversion it is intended a process step in which the first fluid is transformed from the disperse phase into the continuous phase or in a combination of a continuous phase and a disperse phase and the second fluid is transformed from the continuous phase into the disperse phase or in a combination of a continuous phase and a disperse phase. A possible field of use of such a phase inversion method and system is the separation of oil and water.

In WO 2005/005776 it is disclosed, that a phase inversion is used for improving the separation of oil and water in connection with the extraction of such a fluid from formations under the surface of the earth or the sea bed. In the most cases, the oil is forming the continuous phase, which contains water drops. These water drops constitute the disperse phase. This prior art method includes the step of transporting the fluid in a supply pipe or transport pipe to a separator, which is in the form of a tubular separator body or a gravitation tank. The fluid upstream of the separator is subjected to shear forces so that the drops in the supply flow are torn up to form drops that are so small, that the interface generally becomes new and "uncontaminated" by surfactants. The new interface generated by tearing up the drops is very unstable and the drops begin a strong, intense coalescence process, leading to a phase inversion at some stage in the tube downstream of the shear force generating valve. The water drops form the continuous phase as a result of the coalescence process, whereas the oil assumes the role of the disperse phase, also commonly referred to as an oil in water dispersion. Such a phase inversion is advantageous as an oil in water solution forms in general a much less stable dispersion as compared to a water in oil dispersion or in other words, a dispersion in which the water forms the disperse phase and the oil forms the continuous phase. Therefore it is generally known that the separation of oil and water is much easier if oil is the disperse phase and water is the continuous phase. In particular for oils of a large viscosity it is extremely difficult to separate water drops from the oil phase.

It has been observed that the drop size is subject to large variations when the process according to the prior art is used, due to the fact that a valve is used for introducing large local shear forces into the dispersion. These large local shear forces should help to destroy the stable surface of the drops in order to overcome the surface tension responsible for the stability of the water drop in the oil phase. When passing the valve the drops of the dispersion are subjected to shear forces so that they are torn up to form small drops, having an interface which generally becomes new and uncontaminated by surfactants. Such a surfactant is in general considered as a means to stabilise drops. This stabilisation leads in the consequence to a more stable dispersion, making a subsequent separation thereof difficult if not impossible. According to the prior art, shear forces are applied to the drops. The interface including the surfactants is subjected to these shear forces. Consequently the surfactants are sheared away from the interface. The interface of the drops deprived from these surfactants should coalesce more rapidly, thus promoting a phase inversion. However, the start of the phase inversion and its progress can not be precisely controlled. That means, it can not be predicted when and where the phase inversion occurs downstream of the valve. The starting point of the phase inversion and the volumetric ratio of the water phase to the oil phase are subject to considerable variations. The starting point of the phase inversion can not be determined and precisely localised for dimensioning of the phase inversion plant equipment. Moreover, the variations observed in the volumetric ratio of the water phase to the oil phase have the consequence, that large quantities of water may have to be added to the dispersion in order to obtain a phase inversion downstream of the valve. This water fraction according to currently available experimental results with an equipment as disclosed in the prior art may well lie between 40 and 50% when using a valve.

It is an object of the invention to provide a method and a system for a phase inversion for the separation of a first fluid, forming the disperse phase and a second fluid, forming the continuous phase, in particular the first fluid being water and the second fluid being oil, whereby the start of the phase inversion is more predictable. It is a further object of the invention to allow for a phase inversion to occur at a lower volumetric ratio of the first fluid forming the disperse phase.

The problem related with the prior art is solved by a method for phase inversion of a dispersion comprising a first fluid, said first fluid forming a disperse phase and a second fluid, said second fluid forming a continuous phase, comprising the steps of supplying the dispersion in a fluid supply device to a phase inversion means, such that the first fluid is transformed from the disperse phase into the continuous phase and the second fluid is transformed from the continuous phase into the disperse phase whereby drops of the first fluid coalesce in a direction of flow at an element providing a fluid contacting surface. The fluid contacting surface has a specific surface area, which is at least 400 $m^2/m^3$. The first fluid and the second fluid are preferably mixed in a static mixing device.

This method is performed in a system for phase inversion of a dispersion of immiscible fluids comprising a first fluid, said first fluid forming a disperse phase and a second fluid, said second fluid forming a continuous phase, comprising a fluid supply device for supplying the first fluid and the second fluid to a phase inversion means, such that the first fluid is transformable from the disperse phase into the continuous phase and the second fluid is transformable from the continuous phase into the disperse phase. The phase inversion means comprises an element providing a fluid contacting surface for coalescence in a direction of flow. The fluid contacting surface has a specific surface area, which is greater than 400 $m^2/m^3$. The fluid contacting surface can in particular have a specific surface area greater than 750 $m^2/m^3$, preferably greater than 1000 $m^2/m^3$. The specific surface area is defined as the surface area of the fluid contacting surface divided by the volume of the fluid channel, in which the fluid contacting surface is embedded. The element can comprise a static mixing device for mixing the first fluid with the second fluid. The surface area of the static mixing device is the sum of the surface areas of the fluid contacting surfaces forming the static mixing device and also the fluid contacting surface area of the fluid channel.

The fluid contacting surface of the element is preferably configured such, that coalescence of the first fluid forming the disperse phase is promoted. Due to its shape, the element introduces only small shear forces allowing the drops of the first fluid forming the disperse phase to remain stable.

By keeping the shear forces below this upper limit, the generation of smaller droplets can be avoided. Surprisingly, these small shear forces are not only too small to divide drops into smaller droplets, they actually promote coalescence. Coalescence is thus believed to be the main driver for phase inversion.

The use of a static mixing device provides a large surface for the dispersion to mix and provides a large number of locations for promotion of coalescence of drops. Thereby the following advantages are achieved:

The critical volume fraction of the first fluid leading to a phase inversion is shifted to lower values. Thus, the phase inversion can be obtained at lower volume fractions compared to the prior art. In particular for an application of separating water from crude oil, it is normally preferred to use the dispersion as obtained from the well or the sea bed. Any addition of water results in larger process streams, thus requiring larger pumps, tanks and so on, thereby increasing costs of the system substantially. Thus, the inventive system is potentially saving energy and material costs.

It is believed that by use of a static mixing device, shear forces are introduced into the first and second fluids. Due to the fact, that the mixing is performed in a static mixing device having a certain hydraulic diameter and a certain mixer length, shear forces are applied over the whole mixer diameter and also the whole mixer length with the result, that a phase inversion occurs within the static mixing device. Surprisingly, the generation of small drops as suggested by the prior art is not needed. A local peak of shear forces can be avoided by use of a static mixing device. Such a local peak of shear forces is observed when using a valve according to the prior art. By mixer length, it is intended the length of the static mixing device and by diameter it is intended the diameter of the tube. The static mixing device is characterized by channels with a hydraulic diameter $D_h$. The hydraulic diameter is a commonly used term when handling flow in noncircular tubes and channels. $D_h=4A/U$ where A is the cross sectional area and U is the wetted perimeter of the cross-section. The hydraulic diameter is preferably less than 100 mm, advantageously less than 50 mm and most preferred less than 15 mm.

Surprisingly, the starting point for phase inversion can be lowered to a degree unexpected and unknown from the prior art when using a static mixing device in which the surfaces in contact with the first and second fluids are made of metal. The fluid contacting surfaces can also comprise materials of different wetting behavior. Thereby the degree of coalescence can be further adjusted locally within the static mixing device. The fluid contacting surfaces of different wetting behavior can be arranged in an alternating sequence. If the fluid contacting surfaces are for instance cross bars or plates, e.g. corrugated plates, some of these surfaces may be foreseen in a material showing a good wettability for one of the phases present, while others may be foreseen in a material showing a lower or poorer wettability. For a water in oil dispersion, that means that some of the surfaces showing good wetting properties are made of metal, while other surfaces are made of plastic material, which has a poorer wettability. Surfaces with different wettabilities may be arranged in parallel, when viewed in the direction of flow. Alternatively, a first set of surfaces may be made of material with good wettability, while a second set of surfaces arranged upstream or downstream adjacent to said first set of surfaces may be made of material with poorer wettability.

A plurality of static mixing devices or a static mixing device of a hybrid structure may be foreseen. By hybrid structure it is intended a combination of static mixing devices of different geometries or variants. The use of a plurality of static mixing devices provides additional points for enhancing coalescence in particular for stable dispersions. Such an arrangement may be particularly useful for dispersions comprising a heavy oil.

In an advantageous variant the static mixing device has an axis and further includes a plurality of plates arranged in an angle to the axis, for deflecting the fluid flow from its main flow direction parallel to said axis to a flow direction in said angle. Said angle is advantageously in the range of 10 to 80°, preferably in the range of 20 to 75° most preferred in the range of 30 to 60°. According to a second variant, the plates are corrugated plates. The static mixing device may include in another variant a first and second set of cross-bars or webs arranged in a tube, whereby the cross-bars or webs are inclined with respect to a main direction of flow and the first set of cross-bars or webs is arranged in a first plane, and the second set of cross-bars or webs is arranged in a second plane, whereby the first plane and the second plane intersect each other and an angle of at least 30° preferably at least 50° most preferably around 90° is formed between the first and second plane.

A preconditioning device may be arranged in the fluid supply device upstream of the phase inversion means comprising an element providing a fluid contacting surface for coalescence in a direction of flow, such as the static mixing device. The preconditioning device advantageously comprises an element for generating a shear force. Such an element may be a valve as disclosed in WO2005005776 or a de-emulsifier or an electrostatic precipitator. It has been observed, that the use of a valve or a static mixing device as a preconditioning device leads to a further reduction of the amount of multiple drops. The dispersion leaving the preconditioning device therefore is composed of smaller drops than the dispersion entering the preconditioning device. When the preconditioned dispersion enters the static mixing device, the phase inversion occurs in a more controlled way. Such a preconditioning device may be used when a dispersion is to be subjected to a phase inversion, which is taken from the interface layer of a vessel containing at least two immiscible fluids. The interface layer is the layer which separates the heavier of those fluids from the more light weight fluid. Such a dispersion may already stem from an oil-water separator or a settling vessel. This interface layer is in particular characterised by a high stability. In order to separate such a stable dispersion, a phase inversion means is provided preferably in combination with a preconditioning device to be arranged between the outlet of the vessel and the phase inversion means.

The flow velocity of a dispersion is preferably at most 3.5 m/s. In particular the dispersion can have a dynamic viscosity of less than 0.02 Pas. For a dispersion having a dynamic viscosity of 0.02 Pas to 0.1 Pas the flow velocity is preferably at most 2 m/s. For a dispersion having a dynamic viscosity of more than 0.1 Pas the flow velocity is preferably at most 1 m/s.

By keeping the flow velocity small, the introduction of a high shear force into the dispersion can be avoided. Thus in particular for dispersions comprising water as the first fluid and oil as the second fluid the generation of small droplets can be prevented.

A further advantage associated with the use of a static mixing device is a better control of phase inversion. When using an empty tube behind a possible preconditioning device as suggested in the prior art, the volume fraction, in which phase inversion actually occurs, is subject to large fluctuations. These fluctuations thus occur in an ambivalent region, which is characterised by a broad range of volume fractions of the first fluid. A broad range of volume fractions may lead to considerable difficulties to control the process effectively.

A further advantage of the use of an element providing a fluid contacting surface for coalescence in a direction of flow, such as a static mixing device is the possibility of adding chemical additives having in particular an influence on the phase inversion. These chemical additives are readily distributed and mixed in the static mixing device so as to obtain a homogeneous mixture.

Due to the fact that the phase inversion of a homogeneous mixture is more predictable when employing an element providing a fluid contacting surface for coalescence in a direction of flow, such as a static mixing device, process control can be improved. For further reducing the volume fraction of the second fluid, the addition of a make up stream and/or the addition of chemical additives may help to promote phase inversion. For example, such a make up stream includes the addition of water to the water in oil dispersion. The addition of a comparatively smaller water stream to the water in oil mixture may promote the phase inversion in the static mixing device. The addition of chemical additives may be particularly useful for stable water in oil dispersions. The chemical additive contributes to the decontamination of the droplet surface and therefore to the increase of the coalescence rate of the droplets. The surface of the drops is the interface between the first fluid, forming the disperse phase and the second fluid, forming the continuous phase. The chemical additive is concentrated in this interface and due to the reduction of surface tension, the stability of the drops in the dispersion is decreased. The drops are contacted in the static mixing device, where they coalesce and form larger drops which finally form the continuous phase at the exit of the static mixing device. Thus chemical additives may help to promote coalescence of the drops leading to phase inversion at the exit of the static mixing device.

The inverted dispersion is usually further treated in a separation device. In this respect, the phase inversion can be seen also as a means for promoting the separation of the first fluid from the second fluid by modifying the inlet condition of the separation device. Due to the fact that the mobility of the oil drops is greater in an oil in water dispersion, than in a water in oil dispersion, the energy input into the separation means for performing the separation of the dispersion is reduced. Among possible separation means, gravitation separators or centrifuges are mentioned as examples. Furthermore, the transportation of the dispersion in a pipeline is facilitated due to the increase of the mobility of the dispersion and thus a decrease of the required energy input is achieved. The stabilisation of the inversion (avoiding of back-inversion) is increased if static mixing devices are placed at certain distances along the fluid flow in the pipeline.

A further advantage of the use of a static mixing device is the better control of the formation of multiple dispersions. Under the term multiple dispersions, it is intended, that large drops of the first fluid, the disperse phase, contain smaller drops of the continuous phase, that is the second fluid. These small drops have mostly about ½ to ¹/₁₀₀ of the size of the large drop. Such a multiple dispersion is notably more difficult to separate and it has been observed, that by using a device with a small specific surface, e.g. by an empty tube, there is a higher tendency of such multiple dispersions to appear. With the term empty tube, it is intended a tube free from any built-in elements influencing fluid flow, such as for example valves, stirrers, static or dynamic mixing devices, baffles.

As a consequence the volume fraction of the first fluid has to be increased to obtain a phase inversion, entailing the disadvantages mentioned earlier. Due to the fact that a large amount of surface is made available to the dispersion by a static mixing device, the formation of multiple dispersions can be controlled better and limited if not completely avoided. It has been observed that for obtaining a phase inversion of such a multiple dispersion, considerably more fluid forming the disperse phase is to be added to the dispersion before the phase inversion starts. Thus a dispersion mixed by a static mixing device surprisingly requires less addition of disperse fluid as compared to a dispersion passing through the empty tube in order to initiate phase inversion.

A further advantage of the system is, that it is robust against impurities, in particular solid particles present in at least one of the first and second fluids.

The use of a static mixing device also prevents clogging, which is important in particular when fluids containing solids are to be processed.

These and other objects and advantages of the invention will become more apparent from the following detailed description taken in conjunction with the accompanying drawings wherein FIG. 1 shows a schematic flow chart of a phase inversion system incorporating a valve according to the prior art FIG. 2a shows a flow chart of a first embodiment of the invention FIG. 2b shows a schematic drawing the flow through the fluid discharge device according to a first variant FIG. 2c shows a schematic drawing the flow through the fluid discharge device according to a second variant FIG. 3a shows a second embodiment of a phase inversion system according to the invention FIG. 3b shows a schematic drawing the flow through the fluid discharge device according to a first variant of the second embodiment FIG. 3c shows a schematic drawing the flow through the fluid discharge device according to a second variant of the second embodiment FIG. 3d shows a schematic drawing the flow through the fluid discharge device according to a third variant of the second embodiment FIG. 3e shows a schematic drawing the flow through the fluid discharge device according to a fourth variant of the second embodiment FIG. 4a illustrates a static mixing device according to a first variant FIG. 4b is a cross section of the static mixing device according to FIG. 4a FIG. 4c illustrates a static mixing device according to a second variant FIG. 4d illustrates a static mixing device according to a third variant FIG. 4e illustrates a static mixing device having a hybrid structure combined from the second variant and the third variant FIG. 5a illustrates a view on a system according to the invention according to a fourth variant FIG. 5b shows a section A-A of the static mixing device of FIG. 5a FIG. 5c shows a section B-B of the static mixing device of FIG. 5a FIG. 6 illustrates a view on a system according to the invention according to a fifth variant FIG. 7 illustrates a view on a system according to the invention according to a sixth variant FIG. 8 shows the results of tests involving different mixing devices according to the prior art and the invention FIG. 9 to FIG. 11 shows a picture of a dispersion resulting from a system including a static mixing device of a first variant FIG. 10 shows a picture of a dispersion resulting from a system including a static mixing device of a first variant FIG. 11 shows a picture of a dispersion resulting from a system including a static mixing device of a first variant FIG. 12 shows a picture of a dispersion resulting from a system including a static mixing device of a second variant FIG. 13 shows a picture of a dispersion resulting from a system including a static mixing device of a second variant FIG. 14 shows a picture of a dispersion resulting from a system including a static mixing device of a second variant FIG. 15 shows a further picture of a dispersion resulting from a system including a static mixing device of the variant according to FIG. 12 to FIG. 14

Figure 1:
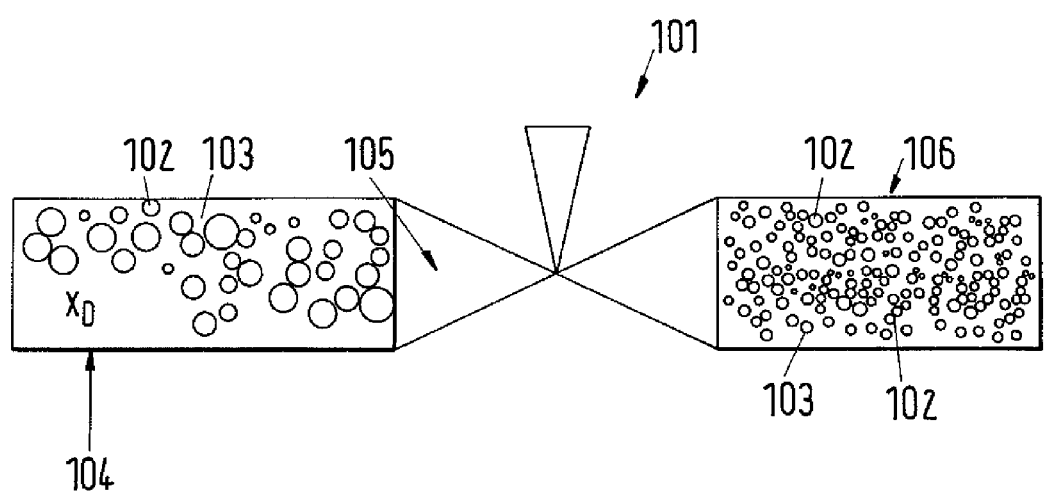

FIG. 1 shows a schematic flow chart of a phase inversion system according to the prior art incorporating a valve according to the method of WO2005/005776. The system 101 for phase inversion of a two phase dispersion of oil and water comprises a first fluid 102, that is water, forming a disperse phase and a second fluid 103, being oil, said oil forming a continuous phase. A fluid supply device 104 is foreseen for supplying the water 102 and the oil 103 to a valve 105. The valve 105 introduces large shearing forces into the oil and water phases, with the result that smaller drops are produced. The shearing forces act on the surface of the drop. One of the consequences resulting therefrom, is that surfactants present on the surface of the drop are taken away from the drop surface. The surfactants are considered to have a stabilising effect on the drop, meaning that as long as the surfactants are present on the drop surface, the drop itself remains stable. Therefrom follows, that the dispersion remains also stable. Due to the introduction of shear forces, small droplets are generated and therefore the surface area increases. The newly generated surface area forming the interface between the water drop and the oil continuous phase is to a large extent not contaminated by surfactants. The new interface is therefore very unstable and the drops begin a strong, intense coalescence process such that the water 102 is transformable from the disperse phase into the continuous phase and the oil 103 is transformable from the continuous phase into the disperse phase, thus leading to a phase inversion. It has been further found out in WO2005/005776, that a stable phase inversion process is obtained, when the original drops are reduced to about a size of less than 10% of the original drop diameter. However a problem remains. The location of the phase inversion can not be determined accurately. At some stage downstream the valve the phase inversion may occur in the empty tube, possibly also dependent on the water content in the oil, however the precise time and location of the phase inversion are not predictable.

FIG. 2a shows the inventive solution schematically according to a first embodiment of the invention. A system 1 for phase inversion of a two phase dispersion of immiscible fluids comprises a first fluid 2, said first fluid forming a disperse phase and a second fluid 3, said second fluid forming a continuous phase. A fluid supply device 4 is foreseen for supplying the first fluid 2 and the second fluid 3 to a static mixing device 5, mixing the first fluid 2 with the second fluid 3 in the static mixing device, such that the first fluid 2 is transformable from the disperse phase into the continuous phase and the second fluid 3 is transformable from the continuous phase into the disperse phase. In other words, a phase inversion occurs within the static mixing device 5, which will also be named isofractional phase inversion. An isofractional phase inversion is thereby defined as a phase inversion in which only the first fluid 2 and the second fluid 3 participate without adding a third fluid or changing the original volume fraction of first and second fluid by addition of either one of them. In a fluid discharge device 6 arranged downstream of the static mixing device 5 and attached thereto, the first fluid and the second fluid are delivered to a separation means. Two cases are possible, a first case as represented in FIG. 2b and a second case, shown in FIG. 2c. FIG. 2b is a schematic drawing of the fluid discharge device 6, in the simplest case in the form of a tube. The first fluid 2 now forms the continuous phase and the second fluid 3 forms the disperse phase. In addition thereto, a portion of the first fluid 2 may be present as disperse phase within the drops of the second fluid 3. FIG. 2c shows the more preferred variant with respect to a subsequent separation step, in which the second fluid 3 is essentially free from drops of the first fluid 2. The variant according to FIG. 2c may advantageously only require one separation step to separate the first and second fluids from each other by a separation means, which is not shown in the flow charts. In particular, the first fluid is water or a slurry of a high water content or an aqueous solution and the second fluid is an oil.

FIG. 3a shows a second embodiment of a phase inversion system 1 according to the invention. Again a fluid supply device 4 is foreseen for supplying the first fluid 2 forming a disperse phase and the second fluid 3 forming a continuous phase to a static mixing device 5. In addition thereto, a make up stream 34 is added to the fluid supply device 4. The make up stream 34 may have the same composition as the first fluid 2. As the make up stream 34 is added to trigger a phase inversion in the static mixing device, this embodiment will be referred to as forced phase inversion. When mixing the first fluid 2 with the second fluid 3 in the static mixing device together with the make up stream 34, the first fluid 2 is transformable from the disperse phase into the continuous phase and the second fluid 3 is transformable from the continuous phase into the disperse phase. This phase inversion occurs—as in the first embodiment of the invention as disclosed in FIG. 2a—within the static mixing device 4. In a fluid discharge device 6 arranged downstream of the static mixing device 5 a multitude of cases of combinations of phases of first, second and make up fluids is possible, some of which are shown in FIG. 3b, FIG. 3c, FIG. 3d, FIG. 3e, all of which have in common, that at least a portion of the first fluid 2 and/or the make up fluid 34 is now present in the continuous phase and the second fluid 3 forms a disperse phase.

The case represented in FIG. 3b shows that the make up fluid 34 remains the continuous phase and the second fluid 3 forms drops therein. In the interior of the drops the first fluid 2 is still present as a disperse phase. The drops of the first fluid 2 have not interacted with each other under this scenario, thus, no coalescence has occurred.

FIG. 3c represents a fluid discharge device 6 containing a the make up fluid 34 as continuous phase and in addition some of the first fluid as continuous phase. According to this schematic representation, the make up fluid 34 and the first fluid 2 in the continuous phase are not mixed. It is very common, however, to use the same fluid as first fluid 2 and make up fluid 34. In the particular case of an oil-water dispersion, both of the first fluid and the make up fluid being water or an aqueous solution or a slurry. Therefore the first fluid 2 forming the continuous phase and the make up fluid 34 are miscible. Some of the first fluid 2 still remains as a disperse phase within the drops of the second fluid 3. This phenomenon will be referred to also as "multiple droplets". Under such circumstances a partial coalescence of drops has occurred. Make up fluid 34 and coalesced drops of the first fluid 2 thus form a continuous phase.

FIG. 3d represents a variant, in which the first fluid 2 is present in the continuous phase. Thus, the make up fluid 34 and the first fluid 2 form the continuous phase, whereas the second fluid 3 forms the disperse phase. Again the make up fluid 34 and the first fluid 2 preferably form a single phase. This variant is by far the easiest to be separated in a subsequent separation step due to the fact that no drops of the first fluid 2 are anymore present in the interior of the drops of the second fluid 3. The drops of the first fluid thus have completely coalesced in the static mixing device. In this case no multiple droplets remain.

FIG. 3e represents a variant, according to which the second fluid 3 forms the disperse phase. A portion of the first fluid 2 and the make up fluid 34 is present in the interior of the drops of the second fluid 3. The drops undergo a partial coalescence. A portion of the make up fluid 34 and the coalesced drops of the first fluid 2 form the continuous phase. This means, that drops of the make up fluid 34 are formed during the passage through the static mixing device 5. These drops remain in the interior of the drops of the second fluid 3 forming the disperse phase.

Figure 4A:
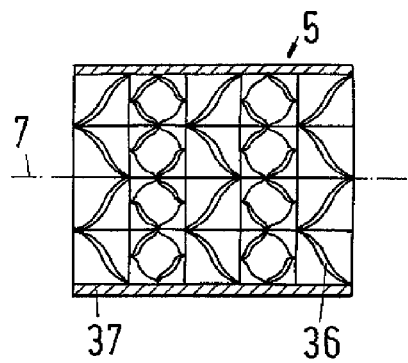
Figure 4B:
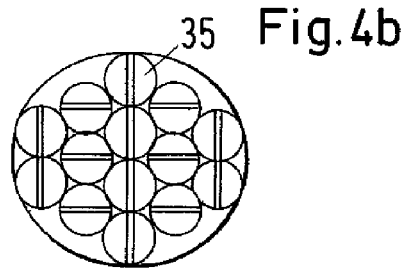

FIG. 4a and FIG. 4b illustrate a static mixing device 5 according to a first variant for use with the first embodiment according to FIGS. 2a to 2c or the second embodiment according to FIG. 3a to FIG. 3e. The static mixing device 5 has an axis 7, which coincides with the axis of the fluid supply device 4. The static mixing device comprises a plurality of static mixing elements 36 of a helical structure arranged in a plurality of tubes 35 arranged in the housing 37 of the static mixing device.

Figure 4C:
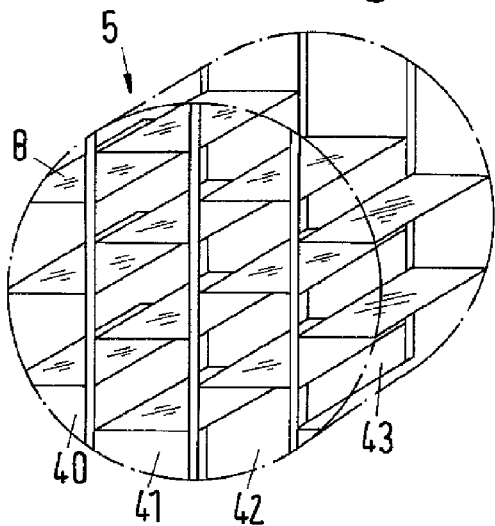

The tubular housing of the static mixing device 5 according to a second variant is not shown in FIG. 4c for allowing a better view on the structure of the plates 8 constituting the mixing element of the static mixing device 5. The plates 8 are arranged in a plurality of rows 40, 41, 42, 43. Preferably plates 8 of the same row extend in planes parallel to each other. The plates 8 serve at one hand as a guide for the flow of the dispersion, on the other hand, they usually create boundary effects in the flow. The flow velocity in close proximity to such a wall decreases to zero on the surface of the plate 8. Thereby a roughly parabolic flow profile for a laminar flow is created in a plane arranged in normal direction to a main direction of flow in a channel 44 extending between two neighbouring plates. The flow velocity in a point lying on the axis of symmetry of such a parabola is highest, whereas flow velocities in the two lateral branches of the parabola decrease continuously towards the end of each branch of the parabola, which corresponds to the wall surface of each one of the plates 8. Due to these flow profiles which are formed in the open channel 44, mixing of the first and second fluid 2, 3 and an optional make up fluid 34 occur. The mixing triggers a coalescence of the drops of the first fluid 2, which is presumed to be due to wall effects. It has been observed that the material properties of the surface of the plates contribute to a surprising extent to the coalescence of the drops, which leads to a phase inversion. Thus, a progressive coalescence of the drops is believed to occur along the walls of the plates, due to the fact that a drop adhering to a wall is partially exposed to the wall surface and partially to the continuous phase formed by the second fluid 3 before phase inversion. Under the conditions of turbulent flow the flow profile will not be parabolic, however, the mechanism of coalescence described above may also apply.

Figure 4D:
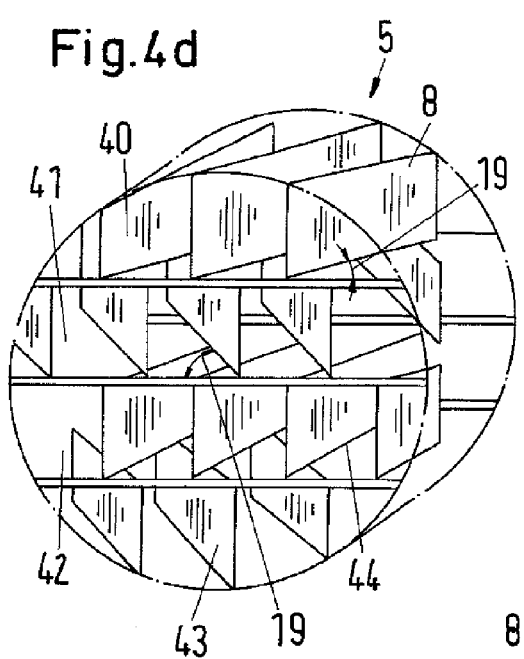

FIG. 4d illustrates a static mixing device according to a third variant of the first embodiment. Advantageously, but not necessarily, at least some of the plates 8 are arranged in an angle 19 with respect to a plane normal to the axis 7. The angle of inclination 19 lies advantageously between 0 and 90°, preferably between 0 and 80° most preferred between 30 and 60°. It is expected that a larger angle of inclination 19 leads to a higher deflection of the fluid. Thus, for a drop, it becomes more likely to come into contact with a wall during its travel through the static mixing device when the angle of inclination is increased. It has been observed that drops coalesce on their path of travel through the mixing device 5. Advantageously the angle of inclination lies between 30° and 60° as in this range the fluids are deflected from their main flow direction parallel to axis 7 of the static mixing device. At the same time pressure drop and shear forces are not so high, that due to the shearing forces a large number droplets of small size are created, which would have a stabilising effect and prevent the occurrence of a phase inversion as observed in the prior art, as shown in FIG. 1.

Figure 4E:
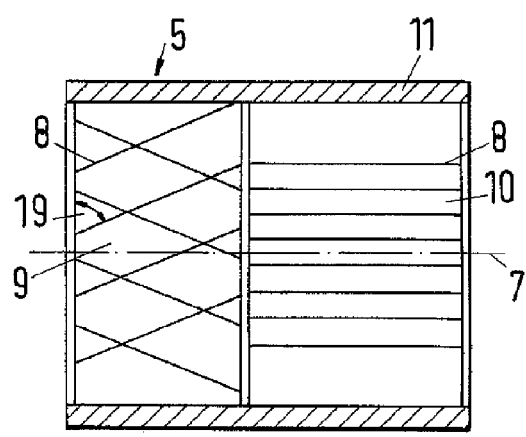

FIG. 4e illustrates a static mixing device having a hybrid structure combined of mixing elements 9, 10 from the second variant and the third variant. The static mixing device 4 is composed of a mixing element according to FIG. 4c and a mixing element according to FIG. 4d. Both of the mixing elements share a common housing 11. The arrangement of mixing elements in series is purely exemplary and should not be construed to be limited to the specifically disclosed embodiment.

Figure 5A:
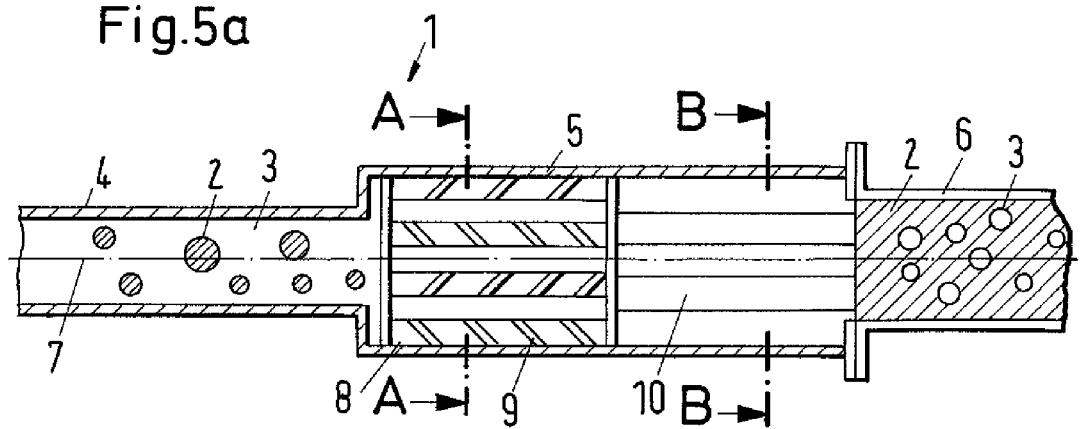
Figure 5B:
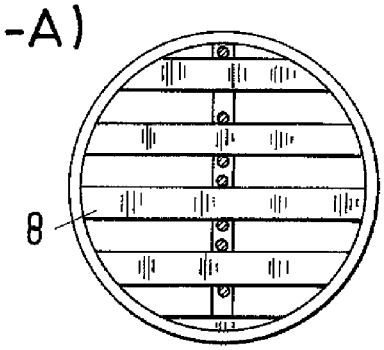

The system according to FIG. 5a is essentially the same as the one shown in FIG. 2a to FIG. 3e. The static mixing device 5 may be composed of static mixing elements 9, 10, whereby two such elements are shown in FIG. 5a. The static mixing element 9 includes a plurality of plates 8 arranged in series in a row. The plates are inclined with respect to a horizontal plane, when installed in horizontal position for deflecting the fluid flow from its main flow direction parallel to said axis. The plates 8 are arranged in a distance to each other so as to allow the fluids to pass between the plates as shown in FIG. 5b, which is a section of mixing element 9 along a plane A-A normal to the axis 7. The static mixing element 9 comprises a plurality of such rows, which are preferably arranged in a distance to each other. Thus, the dispersion passes partly between the rows and is partly diverted by the plates. The plates help the drops to adhere and thus help to promote coalescence of the drops.

Figure 5C:
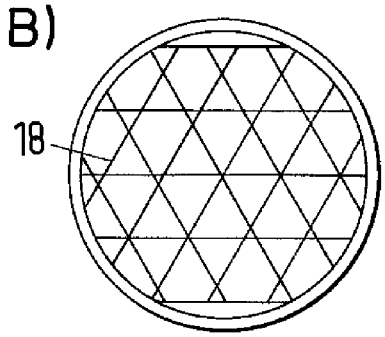

The static mixing element 10 depicted in FIG. 5c has a somewhat different structure. Advantageously the plates are configured as corrugated plates 18 as shown in FIG. 5c, which is a section B-B of the mixing element 10 of FIG. 5a. A corrugated plate 18 comprises a plurality of alternating peaks and valleys. The peaks and valleys of the corrugated plates form open fluid channels. The corrugated plates can be stapled upon each other so as to fill up the housing 11 containing the mixing element. In other words, each mixing element is composed of a plurality of corrugated plates, whereby adjacent corrugated plates are placed in an angle with respect to each other. In other words, corrugated plates are advantageously stapled upon each other in a criss-cross fashion. Channels of adjacent corrugated plates 18 intersect and allow for a redirection of the fluids flowing in the channels and thereby an improved mixing of these fluids is obtainable.

The combination of static mixing elements to form a static mixing device 5 as shown in FIG. 5a is just shown as an example. It is possible to arrange multiple mixing elements of the same type in series or to arrange mixing elements of different type to form hybrid structure as depicted in FIG. 5a. Another variant lying within the scope of this invention is arranging a first mixing element e.g. of the type as shown in FIG. 5b relative to a second mixing element of the same type such that the rows of the first mixing element are disposed in an angle relative to the rows of the second mixing element.

The first fluid 2 and the second fluid 3 exit into a fluid discharge device 6, which may be a conduit or pipe leading to further process equipment, such as separation means, not shown in FIG. 5a. The first fluid, now forming the continuous phase, and the second fluid, now forming the disperse phase enter the separation means for being separated from each other.

Figure 6:
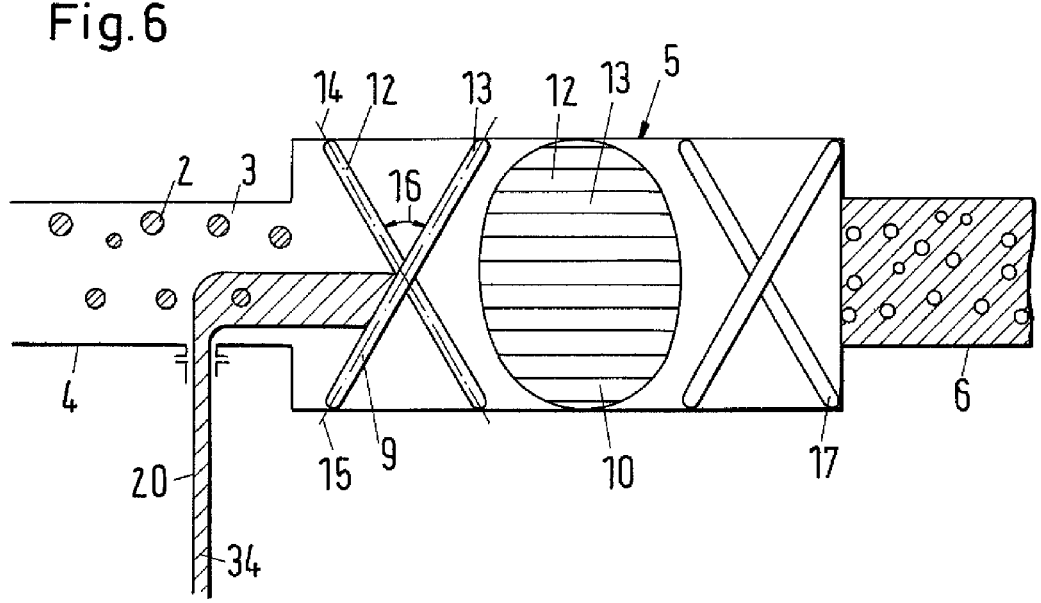

The static mixing device 5 according FIG. 6 includes a static mixing element 9 formed of a first and second set of cross-bars 12, 13 arranged in a tube, whereby the cross-bars of each of the sets 12, 13 are inclined with respect to a main direction of flow and the first set of cross-bars 12 is arranged in a first plane 14, and the second set of cross-bars 13 is arranged in a second plane 15, whereby the first plane and the second plane intersect each other at an angle 16 of at least 30° preferably at least 50° most preferably around 90° is formed between the first and second plane. Such a structure for a static mixing element has already been disclosed in CH 642 564, the contents of this document is hereby incorporated by reference. A plurality of static mixing devices may be arranged in series or a static mixing device of a hybrid structure may be foreseen. Under hybrid structure it is intended that the mixing device is composed of a series or a combination of any one of the individual mixing elements of any of the types disclosed in FIGS. 2 to 7 arranged within a tube. In a hybrid structure at least one of the individual mixing elements has a structure differing from the other mixing elements. Advantageously the plates 8, 18 or the cross-bars 12, 13 of the static mixing device are made of a metal, in particular steel. The metal may be applied as a coating, but most preferably the entire static mixing device is made of metal, in order to increase robustness and stability. Dispersions to be processed by the static mixing device may comprise solids, thus leading to abrasion. For this reason a metal of sufficient hardness is preferred. Additionally a conduit 20 for adding a make up fluid 34 is shown in FIG. 6 which enters the fluid supply device 4 before the first and second fluid enter the static mixing device 5. Such a make-up fluid stream may be provided to promote phase inversion during the passage of the dispersion through the static mixing device. Such a make up fluid stream may be particular advantageous if a phase inversion of a stable emulsion has to be obtained. The make up fluid is mixed with the dispersion within the static mixing device 5. Due to the cross-bars of FIG. 6 or any other of the mixing elements as disclosed in FIGS. 4a to 4e, 5a to 5c the make up fluid is mixed with the dispersion of the first fluid 2 and the second fluid 3.

Figure 7:
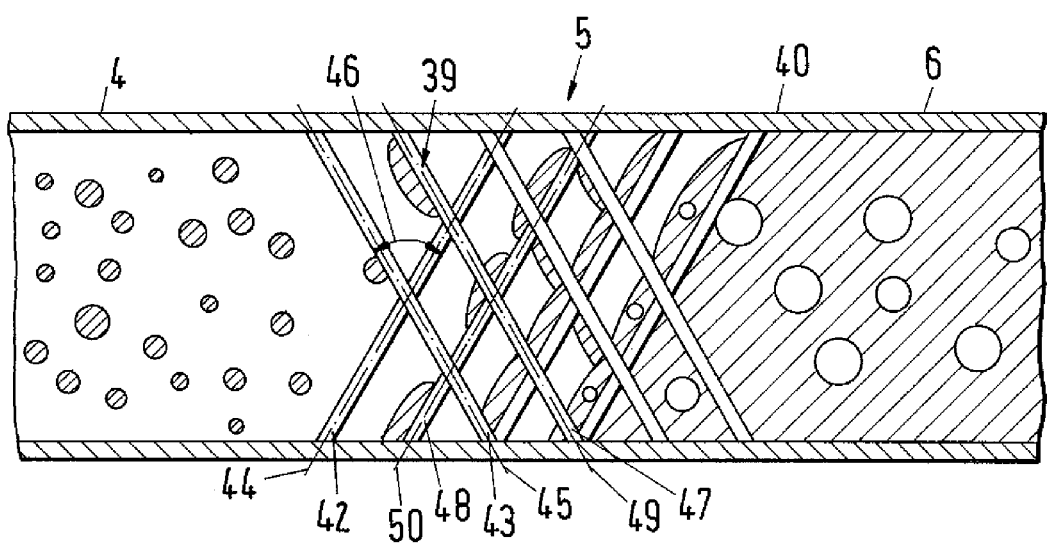

FIG. 7 shows a static mixing device 5, which also includes a mixing element 39 comprising a first and second set of webs 42, 43 arranged in a tube 40 whereby the webs 42 of the first set of webs are inclined with respect to a main direction of flow and the first set of webs 42 is arranged in a first plane 44, and whereby the webs 43 of the second set of webs are inclined with respect to a main direction of flow the second set of webs 43 is arranged in a second plane 45, whereby the first plane 44 and the second plane 45 intersect each other at an angle 46 of at least 30° preferably at least 50° most preferably around 90°. The first set of webs 42 is followed by a third set of webs 47, which is preferably arranged in a third plane 49, whereby the third plane is parallel to the first plane 44 at a location downstream thereof. The second set of webs 43 is followed by a fourth set of webs 48, which is preferably arranged in a fourth plane 50, whereby the fourth plane is parallel to the second plane 45 at a location downstream thereof. Further similar webs may be provided. Advantageously the distance between the first plane 44 and third plane 49 is the same as the distance between the second plane 45 and the fourth plane 50. The webs 42 of the first set of webs do not only cross with the webs 43 of the second set of webs but also with the webs 47 of the third set of webs. It is a particular advantage of this embodiment that the static mixing device as a whole is mechanically more stable due to the multiple interlinking points of more than two sets of crossing webs. In addition to the advantageous structure of the static mixing element 39 it is shown that the diameter of the tube 40 of the fluid supply device 4 and the fluid discharge device 6 is substantially the same as the diameter of tube 40. Herewith dead zones generally impairing the quality of mixing are avoided.

Figure 8:
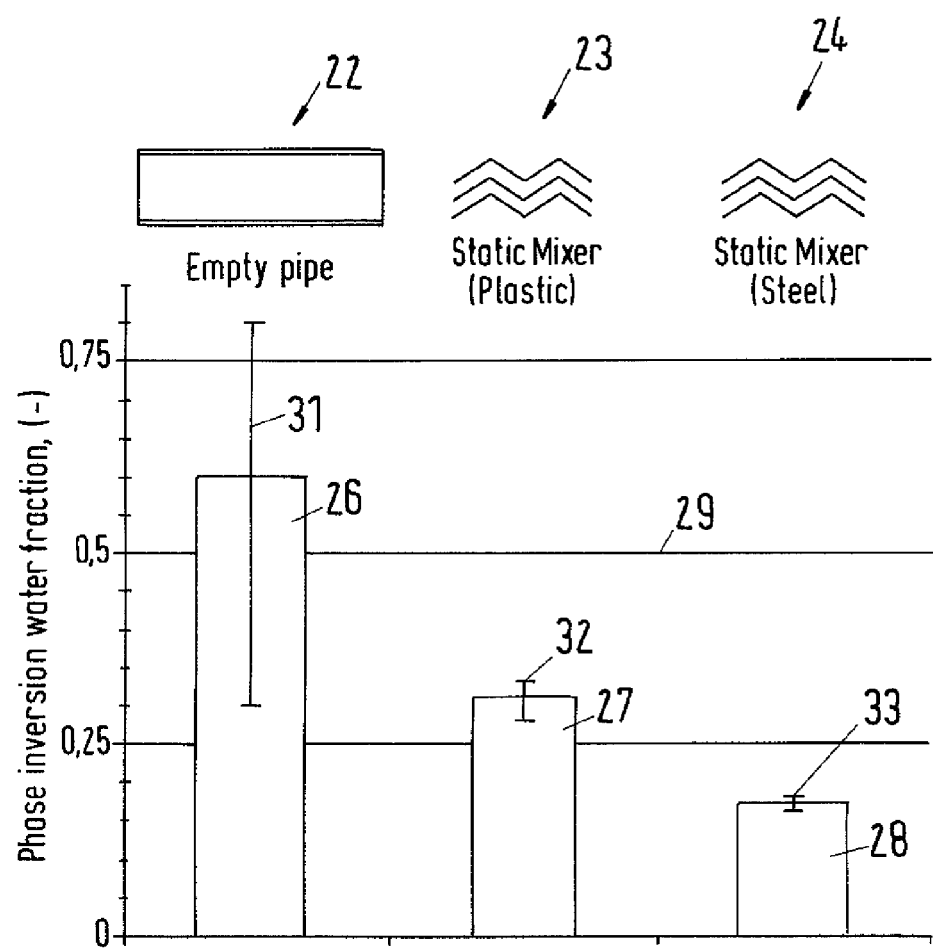

FIG. 8 shows a diagram demonstrating the performance of different means for inducing or promoting a phase inversion for a water-oil system. These means comprise an empty tube 22, a static mixing device made of plastics 23 and a static mixing device made of metal 24. The height of the bars 26, 27, 28 in the diagram represents the percentage of water needed to for a phase inversion in the water-oil system. FIG. 8 shows, that most of the water, that means the highest quantity of water has to be added for triggering a phase inversion in the empty tube 22. An improvement is obtained by a static mixing device made from plastics. However it is clearly visible that a static mixing device of the same type made from a metal still further lowers the starting point for the phase inversion. From these results alone it can already be deduced that the phase inversion is at one hand a function of the type of means chosen and on the other hand dependent on the material used for the means. Surprisingly the starting point for phase inversion can be lowered to a degree unexpected and unknown from the prior art when using a static mixing device in which at least the surfaces in contact with the first and second fluids are made of metal. Tests have shown, that a phase inversion can be obtained at a water content of less than 40%, preferably less than 35% in particular less than 30%. The diagram further shows lines 31, 32, 33. Each of these lines belongs to the respective bar and gives an indication of the spread of starting points of phase inversions observed for any of the mixing devices. The line 31 corresponding to the empty tube thereby indicates by far the largest spread. The spread of starting points as indicated by line 32 for the static mixing device 23 made of plastic material is still considerable, whereas the spread of starting points of the static mixing device made of metal 24 is very small. Therefrom follows, that by employing a static mixing device, the starting point of the phase inversion can be quite accurately predicted, which is clearly not the case for the empty tube conventionally employed for this purpose. This unexpected advantage, obtained in particular by the use of a static mixing device made of metal, helps to keep costs for a process control system low. As the starting point for a phase inversion can be predicted to occur in the static mixing device for each dispersion, any deviation from the optimal point is immediately sensed by the control system, which has the consequence that the control system shows a high degree of responsiveness. Therefore a stable process control is easily obtainable.

Figure 9:
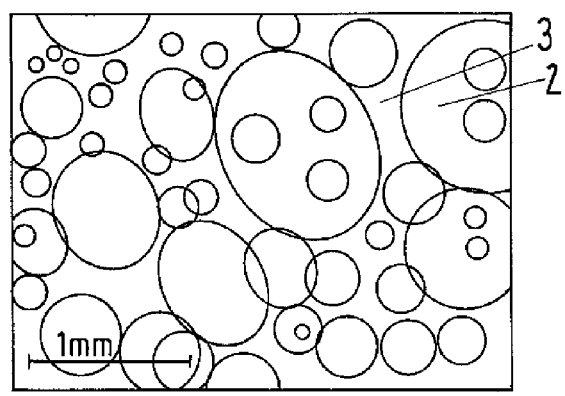
Figure 10:
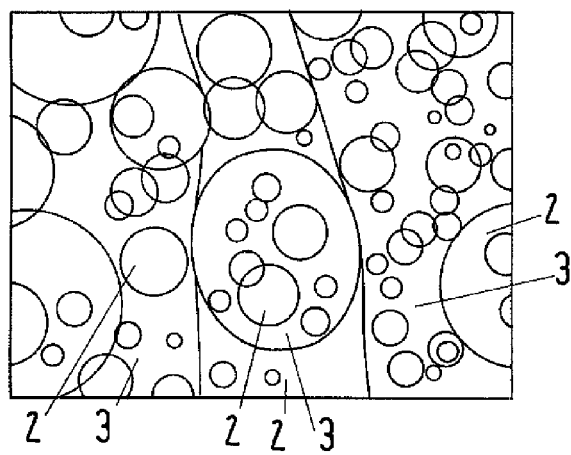
Figure 11:
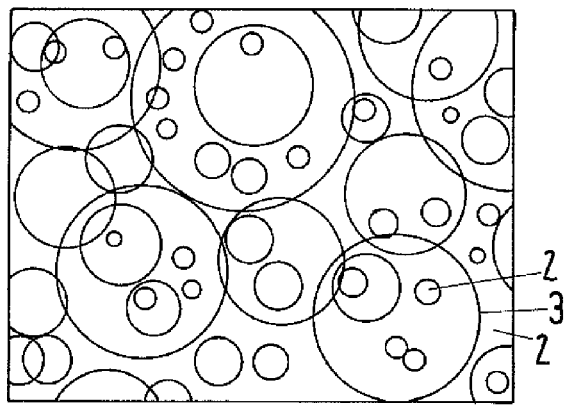

FIG. 9 to FIG. 11 show the results of phase inversions with a system according to the parameters as indicated in table 1. The test facilities included a PhIPP mixer for phase inversion with a DisPP disperser. The first fluid 2 is water, the second fluid 3 is oil. A water in oil dispersion is to be inverted by an empty tube or static mixing device with insufficient wetting behavior for the dispersed phase. The water in oil dispersion is used as fluid to be supplied to the phase inversion device by the fluid supply device.

TABLE 1

| FIG. Nr. | $x_{inv}$ [—] | system [—] | $x_D$ [—] | $d_{32}$ µm | $v_{inv}$ m/s |
|---|---|---|---|---|---|
| 9 | 0.53 | w/o | 0.3 | 150 | 1 |
| 10 | 0.54 | w/o/w and w/o | 0.3 | 150 | 1 |
| 11 | 0.57 | w/o/w | 0.3 | 150 | 1 |

The water fraction of the inlet dispersion $x_D$, the Sauter diameter $d_{32}$, and the flow velocity $v_{inv}$ have been held constant. The Sauter diameter, $d_{32}$ is a representative diameter of the drops and is defined as the diameter of a sphere that has the same volume/surface area ratio as the drop of interest. The Sauter diameter is calculated by dividing the sum of the volumes of all drops of the system to be analysed by the sum of the surface areas of all drops of the same system. Water is added to the dispersion. This results in an increased total amount of water $x_{inv}$ in the static mixing device. In the first case, shown in FIG. 9, no phase inversion has occurred. In FIG. 10 a partial phase inversion has taken place. A portion of the dispersion is still present as a water in oil dispersion, whereas another portion of the dispersion has been transformed into an oil in water dispersion. However, the oil phase of this portion contains a water fraction in the form of small drops, thus a water in oil in water dispersion is present in this case due to the fact the multiple drops remain.

FIG. 11 shows a water in oil in water dispersion. Thus, a phase inversion has been obtained in this case. It is noteworthy that the phase inversion has occurred at high values of $x_{inv}$. By increasing $x_{inv}$ to 57%, the phase inversion occurs in the static mixing device. At the value of 57% water, the phase inversion results in a water in oil in water dispersion, which can only partially be separated easily. Thus, only the continuous water fraction 2 can be separated from the oil drops 3. The water 2 contained within the oil drops still presents the same problems for separation as the dispersion which was present in the fluid supply device before feeding the dispersion into the empty tube. Therefore only the portion of the dispersion which has inverted, may be separated more easily, whereas for the remaining portion, that means the multiple drops, the separation problems associated with a stable water in oil dispersion remain. However this result is still an advantage compared to the prior art, using an empty tube for changing the properties of the water in oil dispersion. If a phase inversion for a portion of the dispersion is obtained by a static mixing device, at least this portion may be separated more easily. Therefrom follows, that already by using a static mixing device of insufficient wettability, reduction of separation costs downstream the fluid discharge device is achieved.

Figure 12:
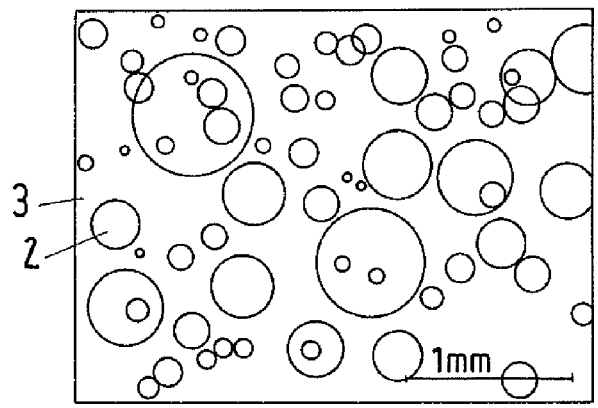
Figure 13:
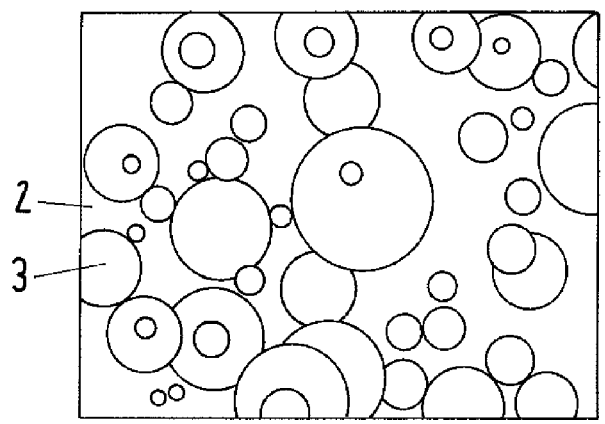
Figure 14:
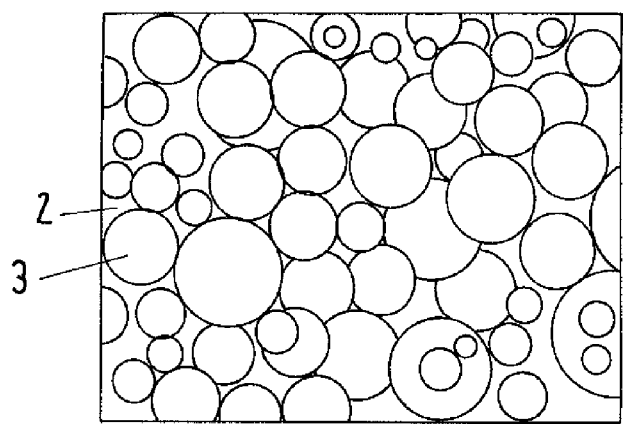

FIGS. 12, 13 and 14 show examples of a phase inversion obtained by use of a static mixing device with good wettability for the dispersed phase according to a second variant. The mixer is made of metal and has a high specific surface. The test facilities included a PhIS2 mixer with a DisPP disperser.

TABLE 2

| FIG. Nr. | $x_{inv}$ [—] | System [—] | $x_D$ [—] | $d_{32}$ µm | $v_{inv}$ m/s |
|---|---|---|---|---|---|
| 12 | 0.19 | w/o | 0.1 | 130 | 1 |
| 13 | 0.2 | o/w | 0.1 | 130 | 1 |
| 14 | 0.3 | o/w | 0.1 | 130 | 1 |

The table 2 shows the parameters used for obtaining the results according to FIG. 12, FIG. 13 and FIG. 14. FIG. 12 shows a comparative example of a water in oil dispersion. The first fluid 2 forming the disperse phase in FIG. 12 is thus water and the second fluid 3 forming the continuous phase is oil. At a water fraction of 0.19, no phase inversion is observed after passage through the static mixing device of the type shown in FIG. 7 having webs with metal surfaces.

Turning to FIG. 13, an oil in water dispersion is shown, thus a phase inversion has occurred in the same experimental setup as used for FIG. 12. The disperse phase in the drops is the second fluid 3, in this case oil, whereas the continuous phase is water. It is particularly noteworthy, that the phase inversion occurs at a very small water fraction change of 0.01 with respect to FIG. 12. Moreover the water fraction of 0.2, at which the phase inversion has occurred, is considerably lower compared to the water fractions achieved by the experiments according to FIG. 9 to FIG. 11 which are well over 0.5. This is even more surprising as the geometry and length of the static mixing device were the same as in the prior art. Thus, the considerable improvement obtained by using a static mixing of good wettability could not have been expected and surprisingly shifts the phase inversion point to a water fraction of 0.2.

FIG. 14 shows, that a phase inversion occurs also when the water fraction is increased either by adding additional water as a make up fluid or by processing a water in oil dispersion having a water content of 0.3.

There is a further interesting and surprising effect to be observed by each of the results of FIG. 12 to FIG. 14. When using a static mixing device of the type as indicated above, the occurrence of multiple drops can be avoided. Thus, in the disperse phase, that is in FIG. 12 water and in FIG. 13 and FIG. 14 oil, almost no traces of the continuous phase are included as small drops as is particularly the case in FIG. 10 and FIG. 11. Thus, the result of FIGS. 12 to 14 corresponds to the situation depicted in FIG. 2c or FIG. 3d if additional water is added before entering the static mixing device. In some cases the situation according to FIG. 3c may occur, however FIGS. 12 to 14 do not show this phenomenon of small water drops within the oil drops clearly.

Figure 15:
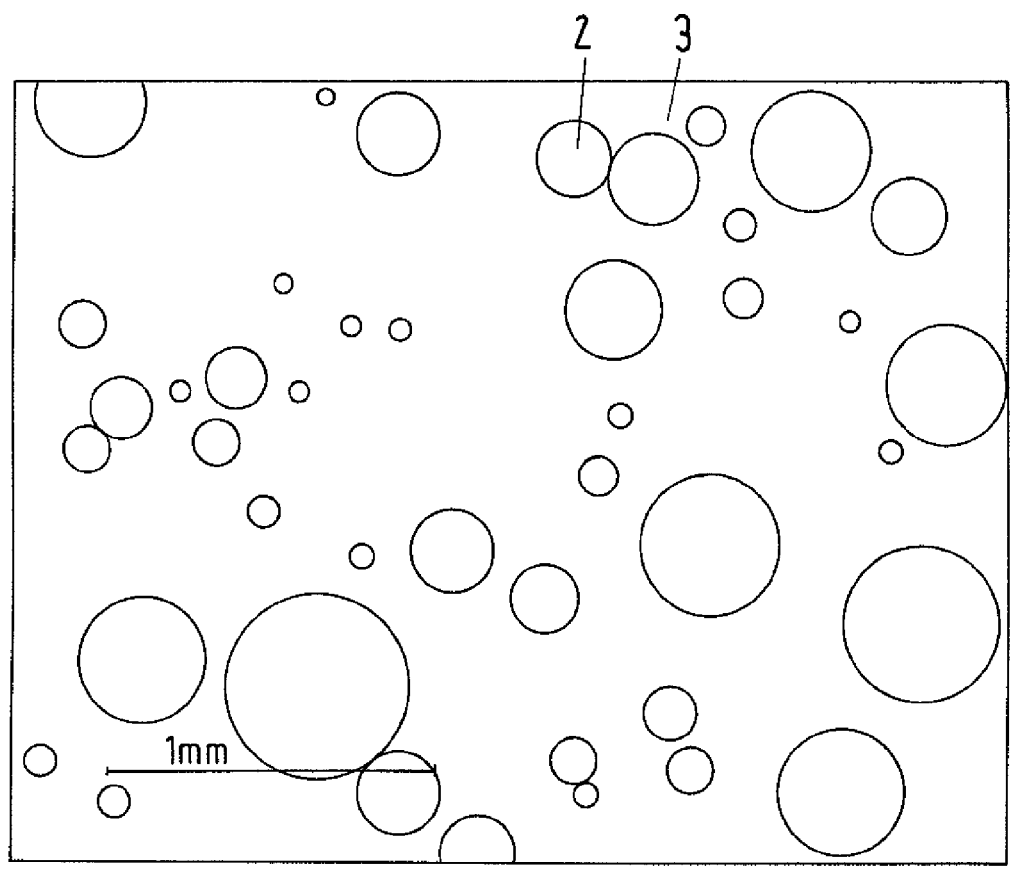

When referring to FIG. 15, a further result is shown by using the same arrangement as for FIGS. 12 to 14. In FIG.

Figure 16:
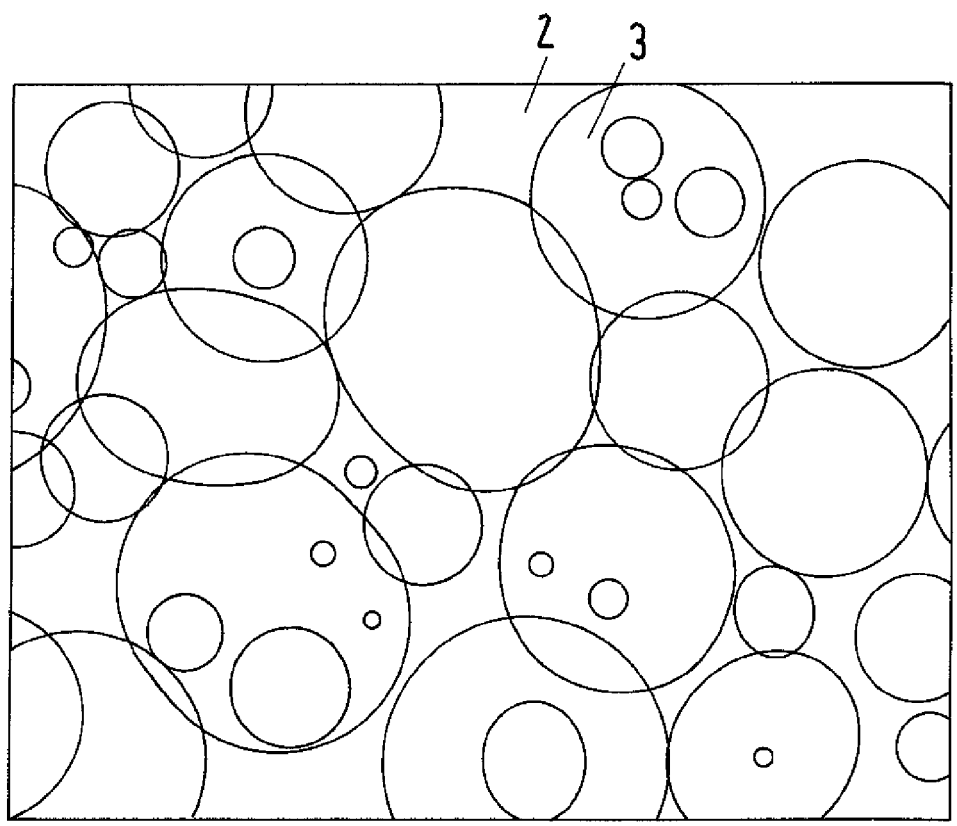
FIG. 16 shows a further picture of a dispersion resulting from a system including a static mixing device of the variant according to FIG. 12 to FIG. 14

15, the water fraction was 0.18, thus no phase inversion has occurred. The first fluid 2, water, is thus present in the disperse phase and the second fluid 3, the oil, is present in the continuous phase. FIG. 16 shows the result for a water fraction of 0.2. As expected by the results of FIGS. 12 to 14, a phase inversion was observed and again, a situation resembling the situation depicted in FIG. 2c or 3d is found for a majority of drops. This means that for the majority of drops, there are no multiple drops present to a notable extent. Only for a minority of drops a situation as shown in FIG. 2b or FIG. 4c occurs. This has the consequence that a separation of the oil in water dispersion is much easier compared to the dispersions of the prior art, and even easier compared to the dispersions of FIGS. 9 to 11.

Figure 17:
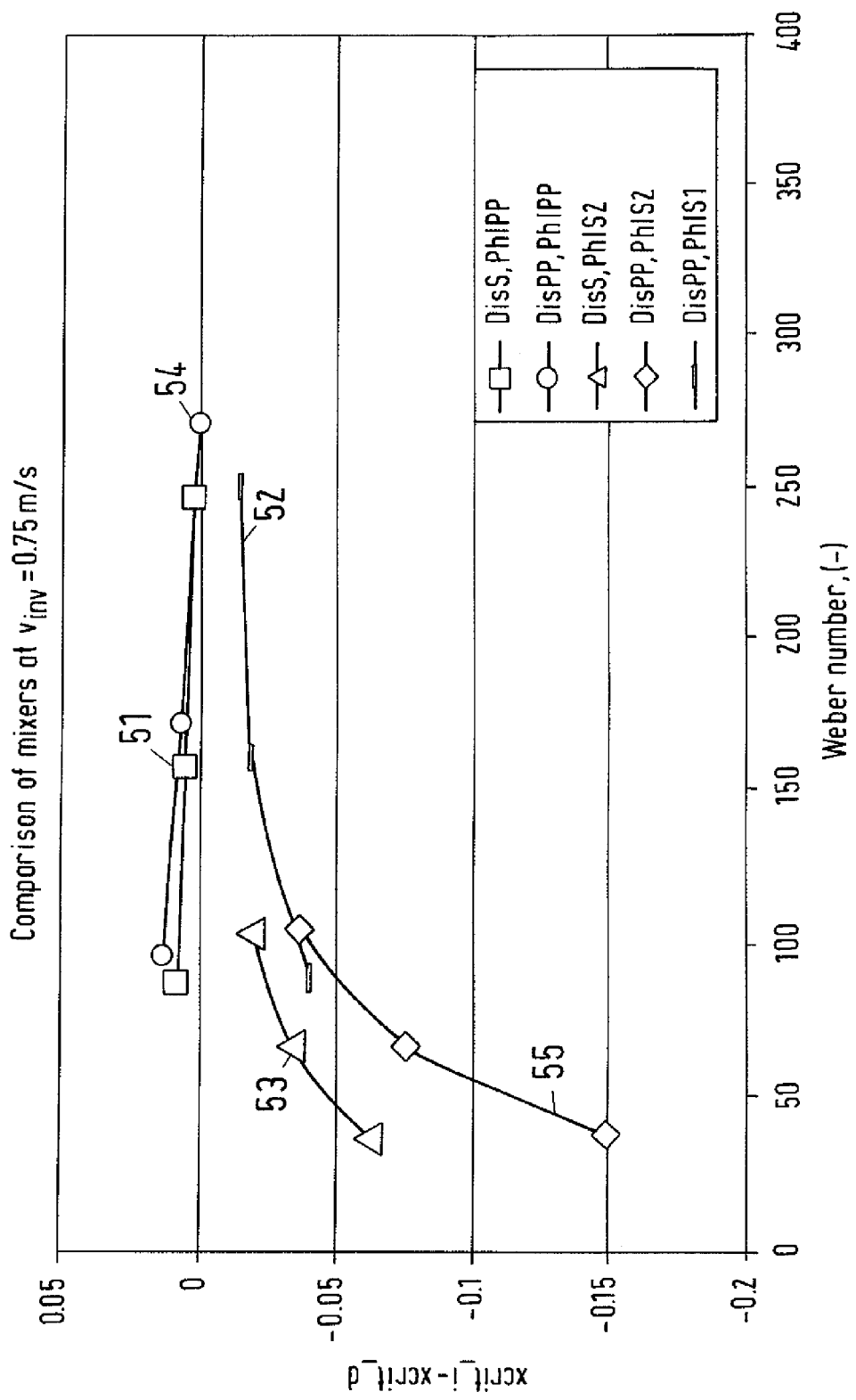
FIG. 17 shows a diagram comparing the results of different static mixing devices for a first flow velocity.
Figure 18:
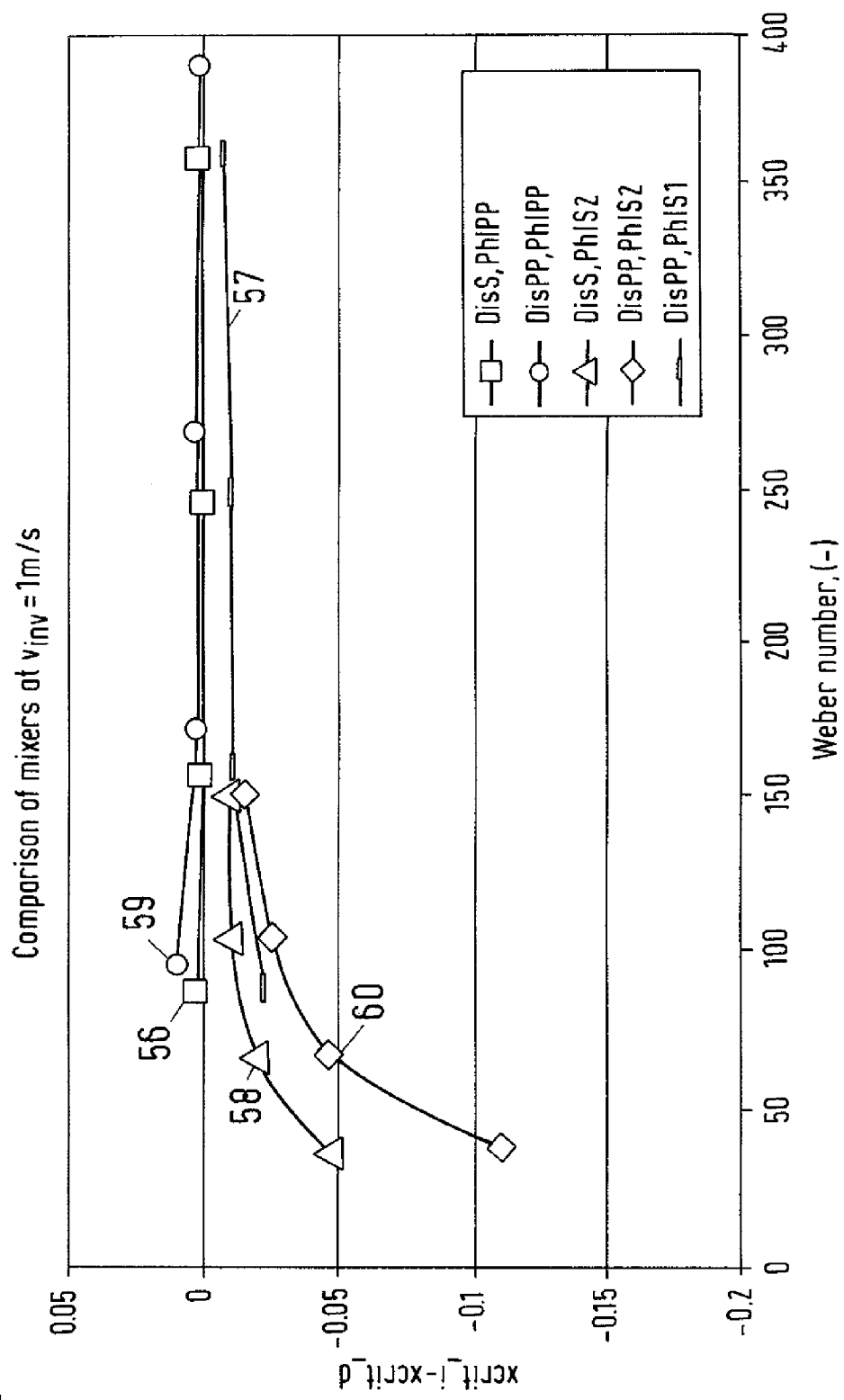
FIG. 18 shows a diagram comparing the results of different static mixing devices for a second flow velocity.

FIG. 17 and FIG. 18 are diagrams showing the performance of static mixing devices in isofractional phase inversion according to FIG. 2a. Three types of static mixing devices have been used, a PhIPP mixer having mixing elements of the Sulzer SMV™, such as disclosed in U.S. Pat. No. 3,785,620 showing insufficient wetting behavior. Furthermore a static mixing device of the type PhIS2 showing best wetting behavior has been used. The PhIS2 mixer is made of steel, having a high specific surface. The PhIS1, is also made of steel, however its performance appears to be a bit worse, but still allows for a phase inversion. Compared thereto, a PhIPP mixer made of plastic material does not invert a water in oil dispersion to an oil in water dispersion at water fractions less than 53%. In particular a static mixing device of the Sulzer SMV™ has been used for obtaining the results of FIG. 17 or 18, or in other words, for each of the tests a static mixing device of the same geometric structure was used. However the static mixing device according to each of FIG. 17 or 18 was made of different materials, namely polypropylene and two different types of stainless steel, one being of the type 1.4306.

On the horizontal axis of the diagram there is indicated the Weber number, a dimensionless number used for characterising fluid flows where there is an interface between two different fluids, especially for multiphase flows with strongly curved interfacial surfaces, such as dispersions. It can be thought of as a measure of the relative importance of the fluid's inertia compared to its surface tension. The quantity is useful in analyzing the formation of droplets and bubbles.

On the vertical axis the difference between xcrit_i-xcrit_d is indicated. The xcrit_i is the critical water fraction for a water in oil dispersion to be inverted in the static mixing device to an oil in water dispersion. xcrit_d is the water fraction at which the dispersion would have inverted by itself without the use of the static mixing device. The difference of xcrit_i-xcrit_d is shown due to the experimental procedure. Values <0 show that a phase inversion from a water in oil dispersion to an oil in water dispersion has been promoted by the static mixing device.

All of the static mixing devices have been subjected to different flow velocity values. A first set of curves 51, 52, 53, 54, 55 shown in FIG. 17 has been obtained with a flow velocity of 0.75 m/s. Either a DisS disperser or a DisPP disperser was used upstream to the phase inversion mixer. The disperser is used to generate a dispersion for the experimental set up. The two dispersers differ from each other such that they are made of steel in the case of the DisS and polypropylene in the case of DisPP. The drop size obtained by the dispersers differs, such that by use of the DisS disperser, drops of small size result, whereas by using a DisPP disperser larger drops are obtained.

The following reference numbers are referred to in FIG. 17 wherein the isofractional phase inversion system was operated at 0.75 m/s:
51,54 curve for mixer PhIPP
52 curve for mixer PhIS1
53,55 curve for mixer PhIS2

The term "PP" stands for a static mixer element made of plastics in this particular case made from polypropylene.

The term "S" stands for a static mixer element made of stainless steel. In particular a stainless steel of the type 1.4306 has been used for the static mixer element arrangement by which the best results have been obtained.

A second set of curves 56, 57, 58, 59, 60 has been obtained with a flow velocity of 1 m/s which is shown in FIG. 18.
56,59 curve for mixer PhIPP
57 curve for mixer PhIS1
58,60 curve for mixer PhIS2

FIG. 17 to FIG. 18 show that by shifting the flow velocity to higher values the starting point of the phase inversion is considerably influenced. The phase inversion occurs at lower volume fractions of the disperse phase when the flow velocity is lower, thereby comparing the results obtained by one type of static mixing device, in particular a static mixing device made of a steel of two different types.

The disperser according to FIG. 17 or FIG. 18 is an example for a preconditioning device and can be a valve or a static mixing device which is positioned in the fluid supply device upstream of the static mixing device. Such a preconditioning device can be added to any of the embodiments described before. As has been outlined in connection with the prior art, it can be used to generate small drops. However it is used for a completely different purpose in connection with any of the embodiments described. It has been observed that by making use of a preconditioning device, such as a valve or a static mixing device, the amount of multiple drops can be further reduced. The dispersion leaving the preconditioning device is composed of smaller drops than the dispersion entering the preconditioning device. When the dispersion obtained by the preconditioning device enters the static mixing device, the phase inversion occurs in a more controlled way. Optionally make up fluid may be added to the fluid supply device before the preconditioning device or between the preconditioning device and the static mixing device.

The flow velocity of a dispersion having a dynamic viscosity of less than 0.02 Pas is preferably at most 3.5 m/s, the flow velocity of a dispersion having a dynamic viscosity of 0.02 Pas to 0.1 Pas is preferably at most 2 m/s, the flow velocity of a dispersion having a dynamic viscosity of more than 0.1 Pas is preferably at most 1 m/s.

The flow velocity is calculated in reference to an empty tube of circular cross-section. The flow velocity is defined as the volume flow [m$^3$/s] divided by the cross-sectional area [m$^2$] of an empty tube of circular cross-section.

For each of the ranges of dynamic viscosities and flow velocities the following static mixing devices have been used. The material specifications correspond to the previously mentioned static mixing devices, thus the PhIPP is a static mixing device of the SMV™ type with fluid contacting surfaces made of polypropylene, the PhIS1 is a static mixing device of the SMV™ type with fluid contacting surfaces made of a general purpose steel, the PhIS2 is a static mixing device of the SMV™ type with fluid contacting surfaces made of stainless steel of the type 1.4306.

In particular, static mixing devices with the geometrical characteristics as shown in Table 3 have been used.

TABLE 3

| Mixer ID | Specific surface area [$m^2/m^3$] |
| --- | --- |
| PhIPP | 608 |
| PhIS1 | 583 |
| PhIS2 | 1524 |

Table 3 shows that the remarkably improved reduction of the critical water fraction xcrit_i for any material with good wettability for the first fluid, in this case water, is surprisingly related to the specific surface area of the static mixing device. Thus in particular for a static mixing device made of metal, the phase inversion fraction according to FIG. 8 is less than 30%.

By an increasing number of plates arranged in the fluid flow, the specific surface area is increased. For example for the static mixing device PhIS2, a specific surface area of 1524 [$m^2/m^3$] is obtained. The plates are arranged substantially parallel to the main flow direction, which is parallel to the axis of the static mixing device, for example the axis 7 for the static mixing device according to FIG. 5a. The plates are preferably corrugated plates. The corrugations are preferably inclined to the main flow direction. The angle of inclination of the corrugation with respect to the axis angle is 10 to 80°, preferably 20 to 75° most preferred 30 to 60°. The corrugations of adjacent plates can be arranged in a crossing relationship, thereby a cross-corrugated structure is obtainable. Thus, the plates are stacked side-by-side, such that the direction of the corrugation is reversed in neighbouring plates. Thus the plates define a plurality of crossing passages, through which the first and second fluids can flow.

The invention is not limited to oil and water systems. It is equally applicable to any system of immiscible fluids.

The invention is not limited to the use of two immiscible fluids. It is equally applicable to mixtures comprising more than two components and to mixtures containing solids and/or gas phases.

The invention claimed is:

1. A system for phase inversion of a dispersion of immiscible fluids comprising
    a fluid supply device for supplying a fluid dispersion at a flow velocity of at most 3.5 m/s, said dispersion comprising a first fluid forming a disperse phase and a second fluid forming a continuous phase; and
    a phase inversion means for receiving said fluid dispersion from said fluid supply device at said flow velocity and transforming a portion of the first fluid from the disperse phase into the continuous phase and for transforming the second fluid from the continuous phase into the disperse phase, said phase inversion means comprising an element providing a fluid contacting surface for coalescence in a direction of flow, said fluid contacting surface having a specific surface area of at least 400 $m^2/m^3$ and wherein said element comprises a static mixing device for mixing the first fluid with the second fluid and wherein said static mixing device includes a first set of cross-bars arranged in a tube with said cross-bars thereof inclined with respect to a main direction of flow and arranged in a first plane and a second set of cross-bars arranged in said tube with said cross-bars thereof inclined with respect to said main direction of flow and arranged in a second plane intersecting said first plane at an angle of at least 30°.

2. A system according to claim 1 wherein second plane intersects said first plane at an angle of at least 50°.

3. A system according to claim 1 wherein second plane intersects said first plane at an angle of at least 90°.

4. A system for phase inversion of a dispersion of immiscible fluids comprising
    a fluid supply device for supplying a fluid dispersion at a flow velocity of at most 3.5 m/s, said dispersion comprising a first fluid forming a disperse phase and a second fluid forming a continuous phase; and
    a phase inversion means for receiving said fluid dispersion from said fluid supply device at said flow velocity and transforming a portion of the first fluid from the disperse phase into the continuous phase and for transforming the second fluid from the continuous phase into the disperse phase, said phase inversion means comprising an element providing a fluid contacting surface for coalescence in a direction of flow, said fluid contacting surface having a specific surface area of at least 400 $m^2/m^3$ and wherein said element comprises a static mixing device for mixing the first fluid with the second fluid and wherein said static mixing device includes a first set of webs arranged in and extending across a tube with said webs thereof inclined with respect to a longitudinal axis of said tube and arranged in a first plane and a second set of webs arranged in and extending across said tube with said webs thereof inclined with respect to said longitudinal axis and arranged in a second plane intersecting said first plane at an angle.

* * * * *

UNITED STATES PATENT AND TRADEMARK OFFICE
CERTIFICATE OF CORRECTION

PATENT NO. : 9,452,371 B2
APPLICATION NO. : 12/737430
DATED : September 27, 2016
INVENTOR(S) : Ansor Gäbler et al.

It is certified that error appears in the above-identified patent and that said Letters Patent is hereby corrected as shown below:

TITLE PAGE

Item (73) "Sulzer Chemtec AG" should be --Sulzer Chemtech AG--

Signed and Sealed this
Twenty-ninth Day of November, 2016

Michelle K. Lee
*Director of the United States Patent and Trademark Office*